US012073975B2

(12) United States Patent
Kobayashi et al.

(10) Patent No.: US 12,073,975 B2
(45) Date of Patent: Aug. 27, 2024

(54) REACTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Takehito Kobayashi, Mie (JP); Kohei Yoshikawa, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 568 days.

(21) Appl. No.: 17/418,833

(22) PCT Filed: Jan. 7, 2020

(86) PCT No.: PCT/JP2020/000202
§ 371 (c)(1),
(2) Date: Jun. 27, 2021

(87) PCT Pub. No.: WO2020/145276
PCT Pub. Date: Jul. 16, 2020

(65) Prior Publication Data

US 2022/0076870 A1 Mar. 10, 2022

(30) Foreign Application Priority Data

Jan. 10, 2019 (JP) ................................ 2019-002997

(51) Int. Cl.
*H01F 27/02* (2006.01)
*H01F 27/24* (2006.01)
*H01F 27/28* (2006.01)

(52) U.S. Cl.
CPC .......... *H01F 27/022* (2013.01); *H01F 27/24* (2013.01); *H01F 27/28* (2013.01)

(58) Field of Classification Search
CPC ........ H01F 27/022; H01F 27/24; H01F 27/28; H01F 37/00; H01F 27/02
See application file for complete search history.

(56) References Cited

U.S. PATENT DOCUMENTS

2006/0201799 A1* 9/2006 Carrasco-Aguirre ... H01F 27/02 204/279
2009/0144967 A1* 6/2009 Hasu .................. H01F 27/2847 29/605

(Continued)

FOREIGN PATENT DOCUMENTS

JP 2009-088007 A 4/2009
JP 2013-131567 A 7/2013

(Continued)

OTHER PUBLICATIONS

International Search Report issued on Mar. 24, 2020 for WO 2020/145276 A1 (4 pages).

*Primary Examiner* — Mang Tin Bik Lian
(74) *Attorney, Agent, or Firm* — Venjuris, P.C.

(57) ABSTRACT

A reactor is provided with a coil including a pair of winding portions arranged in parallel, a magnetic core, a case for accommodating an assembly including the coil and the magnetic core, and a sealing resin portion to be filled into the case. The case includes a bottom plate portion, the assembly being placed on the bottom plate portion, a side wall portion constituted by a rectangular frame body for surrounding the assembly, and an opening provided on a side opposite to the (Continued)

bottom plate portion. The pair of winding portions are is orthogonal to the bottom plate portion. The side wall portion includes a pair of short side portions and a pair of long side portions. The short side portion or the long side portion includes a groove portion continuously provided from the opening side toward the bottom plate portion side and open inward of the case.

14 Claims, 5 Drawing Sheets

(56) References Cited

U.S. PATENT DOCUMENTS

| | | | | |
|---|---|---|---|---|
| 2016/0358704 | A1* | 12/2016 | Suzuki | H01F 27/06 |
| 2017/0330671 | A1* | 11/2017 | Athavale | H01F 27/22 |
| 2019/0131052 | A1 | 5/2019 | Kusawake et al. | |
| 2019/0206615 | A1* | 7/2019 | Suzuki | H01F 27/29 |
| 2021/0050138 | A1* | 2/2021 | Pal | H01F 27/2876 |

FOREIGN PATENT DOCUMENTS

| | | | | |
|---|---|---|---|---|
| JP | 2017-028084 | A | | 2/2017 |
| JP | 2019-212721 | A | | 12/2019 |
| WO | WO 2015178208 | | * | 11/2015 |

* cited by examiner

REACTOR

CROSS REFERENCE TO RELATED APPLICATIONS

This application is a national phase of PCT application No. PCT/JP2020/000202, filed on 7 Jan. 2020, which claims priority from Japanese patent application No. 2019-002997, filed on 10 Jan. 2019, all of which are incorporated herein by reference.

TECHNICAL FIELD

The present disclosure relates to a reactor.

BACKGROUND

Patent Document 1 discloses a reactor including a coil, a magnetic core, a case for accommodating an assembly of the coil and the magnetic core and a sealing resin for covering the outer periphery of the assembly. In Patent Document 1, an introduction path for the sealing resin is integrally formed in a constituent member of the reactor to fill the sealing resin from a bottom side of the case toward an opening side of the case. A side wall portion of the case surrounding the outer periphery of the assembly is illustrated as the constituent member forming the introduction path.

PRIOR ART DOCUMENT

Patent Document

Patent Document 1: JP 2013-131567 A

SUMMARY OF THE INVENTION

A first reactor according to the present disclosure is provided with a coil including a pair of winding portions arranged in parallel, a magnetic core to be arranged inside and outside the winding portions, a case for accommodating an assembly including the coil and the magnetic core, and a sealing resin portion to be filled into the case, wherein the case includes a bottom plate portion, the assembly being placed on the bottom plate portion, a side wall portion constituted by a rectangular frame body for surrounding the assembly, and an opening provided on a side opposite to the bottom plate portion, the pair of winding portions are so arranged that a parallel direction is orthogonal to the bottom plate portion, the side wall portion includes a pair of short side portions and a pair of long side portions, and the short side portion or the long side portion includes a groove portion continuously provided from the opening side toward the bottom plate portion side and open inward of the case.

A second reactor according to the present disclosure is provided with a coil including a pair of winding portions arranged in parallel, a magnetic core to be arranged inside and outside the winding portions, a case for accommodating an assembly including the coil and the magnetic core, and a sealing resin portion to be filled into the case, wherein the case includes a bottom plate portion, the assembly being placed on the bottom plate portion, a side wall portion constituted by a rectangular frame body for surrounding the assembly, and an opening provided on a side opposite to the bottom plate portion, the pair of winding portions are so arranged that axes thereof are orthogonal to the bottom plate portion, the side wall portion includes a pair of short side portions and a pair of long side portions, and the short side portion or the long side portion includes a groove portion continuously provided from the opening side toward the bottom plate portion side and open inward of the case.

DETAILED DESCRIPTION TO EXECUTE THE INVENTION

Technical Problem

Figure 1:
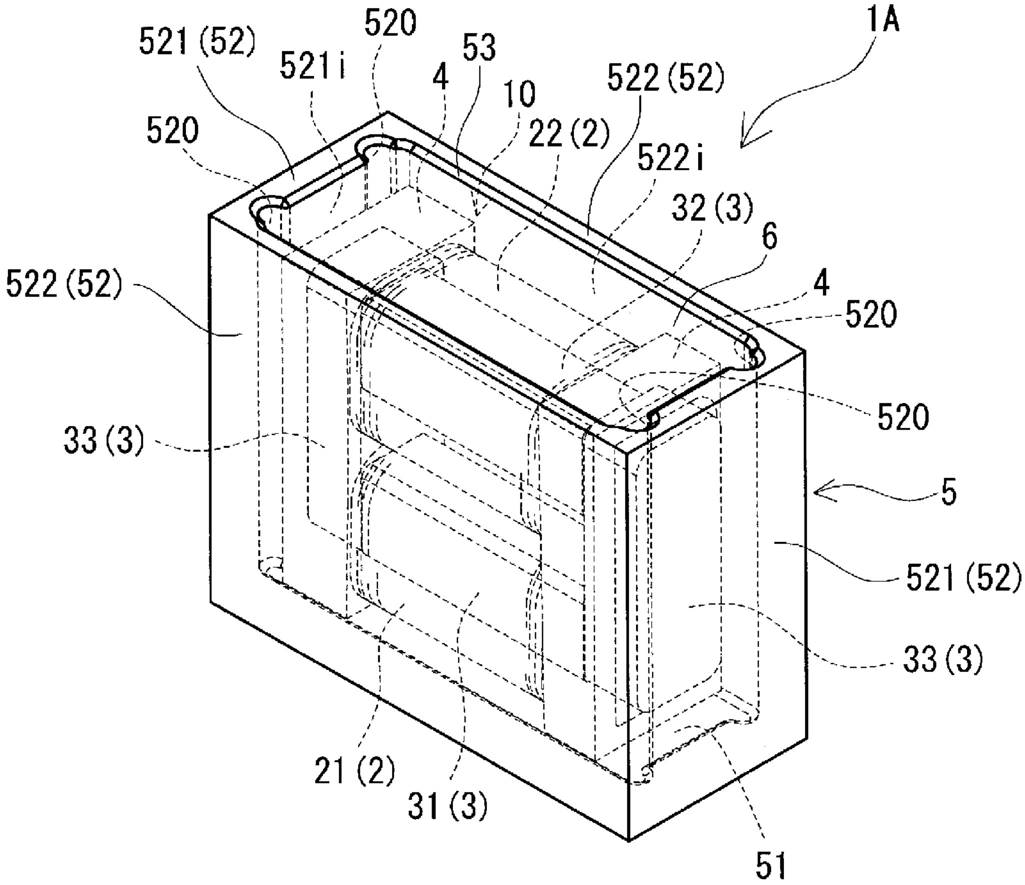
FIG. 1 is a schematic perspective view showing a reactor of a first embodiment.

It is desired to further miniaturize a reactor. The miniaturization of the reactor here means a small installation area of the reactor and a small interval between an assembly and a case. It is also desired to further improve the heat dissipation of the reactor. The reactor described in Patent Document 1 has room for improvement in improving miniaturization and heat dissipation.

Accordingly, one object of the present disclosure is to provide a reactor small in size and excellent in heat dissipation.

Effect of Present Disclosure

The reactor of the present disclosure is small in size and excellent in heat dissipation.

Description of Embodiments of Present Disclosure

First, contents of embodiments of the present disclosure are listed and described.

(1) A first reactor according to an embodiment of the present disclosure is provided with a coil including a pair of winding portions arranged in parallel, a magnetic core to be arranged inside and outside the winding portions, a case for accommodating an assembly including the coil and the magnetic core, and a sealing resin portion to be filled into the case, wherein the case includes a bottom plate portion, the assembly being placed on the bottom plate portion, a side wall portion constituted by a rectangular frame body for surrounding the assembly, and an opening provided on a side opposite to the bottom plate portion, the pair of winding portions are so arranged that a parallel direction is orthogonal to the bottom plate portion, the side wall portion includes a pair of short side portions and a pair of long side portions, and the short side portion or the long side portion includes a groove portion continuously provided from the opening side toward the bottom plate portion side and open inward of the case.

In the reactor of the present disclosure, the coil in the case is so arranged that the parallel direction of the pair of winding portions is orthogonal to the bottom plate portion. This arrangement mode is called a vertically stacked type. On the other hand, in the reactor described in Patent Document 1, the coil in the case is so arranged that the parallel direction of the pair of winding portions is parallel to the bottom plate portion. This arrangement mode is called a horizontally placed type.

The reactor of the present disclosure including the coil of the vertically stacked type can reduce an installation area with respect to the bottom plate portion of the case as compared to a reactor including a coil of the horizontally placed type. This is because a length of the assembly along a direction orthogonal to both the parallel direction of the pair of winding portions and axial directions of the both winding portions is generally shorter than a length of the assembly along the parallel direction of the pair of winding portions. Thus, the reactor of the present disclosure is thin and small in size. Particularly, the reactor of the present disclosure including the coil of the vertically stacked type can reduce the installation area with respect to the bottom plate portion of the case as compared to a reactor including a coil of an upright type to be described later if the length of the assembly along the parallel direction of the pair of winding portions is longer than a length of the assembly along the axial directions of the winding portions.

The reactor of the present disclosure including the coil of the vertically stacked type is excellent in heat dissipation as compared to the reactor including the coil of the horizontally placed type. This is because the coil of the vertically stacked type can increase facing areas of the winding portions and the case and easily releases heat generated in the assembly to the case as compared to the coil of the horizontally placed type.

By providing the groove portion in the side wall portion of the case, the reactor of the present disclosure can inject a resin for constituting the sealing resin portion from the bottom plate portion side toward the opening side of the case and prevent the mixing of air bubbles into the sealing resin portion in forming the sealing resin portion. Thus, the reactor of the present disclosure can satisfactorily fill the sealing resin portion between the assembly and the case and satisfactorily release the heat generated in the assembly to the case via the sealing resin portion, and is excellent in heat dissipation. Further, since the sealing resin portion can be satisfactorily filled between the assembly and the case by the groove portion, the interval between the assembly and the case can be reduced and the reactor can be miniaturized.

(2) A second reactor according to an embodiment of the present disclosure is provided with a coil including a pair of winding portions arranged in parallel, a magnetic core to be arranged inside and outside the winding portions, a case for accommodating an assembly including the coil and the magnetic core, and a sealing resin portion to be filled into the case, wherein the case includes a bottom plate portion, the assembly being placed on the bottom plate portion, a side wall portion constituted by a rectangular frame body for surrounding the assembly, and an opening provided on a side opposite to the bottom plate portion, the pair of winding portions are so arranged that axes thereof are orthogonal to the bottom plate portion, the side wall portion includes a pair of short side portions and a pair of long side portions, and the short side portion or the long side portion includes a groove portion continuously provided from the opening side toward the bottom plate portion side and open inward of the case.

In the reactor of the present disclosure, the coil in the case is so arranged that axial directions of both of the pair of winding portions are orthogonal to the bottom plate portion of the case. This arrangement mode is called an upright type. The reactor of the present disclosure including the coil of the upright type can reduce an installation area with respect to the bottom plate portion of the case as compared to a reactor including a coil of the horizontally placed type. This is because a length of the assembly along a direction orthogonal to both a parallel direction of the pair of winding portions and the axial directions of the both winding portions is generally shorter than a length of the assembly along the axial directions of the winding portions. Thus, the reactor of the present disclosure is thin and small in size. Particularly, the reactor of the present disclosure including the coil of the upright type can reduce the installation area with respect to the bottom plate portion of the case as compared to a reactor including a coil of the vertically stacked type if the length of the assembly along the axial directions of the winding portions is longer than a length of the assembly along the parallel direction of the winding portions.

Further, the reactor of the present disclosure including the coil of the upright type is excellent in heat dissipation as compared to the reactor including the coil of the horizontally placed type. This is because the coil of the upright type can increase facing areas of the winding portions and the case and easily releases heat generated in the assembly to the case as compared to the coil of the horizontally placed type.

By providing the groove portion in the side wall portion of the case, the reactor of the present disclosure is small in size and excellent in heat dissipation, similarly to the reactor described in (1) above.

(3) As an example of the reactor of the present disclosure, the groove portion may be provided in the short side portion.

By providing the groove portion in the short side portion of the side wall portion, a thinner reactor is easily obtained.

(4) As an example of the reactor of the present disclosure, the groove portion may be provided in one of the pair of short side portions or one of the pair of long side portions.

By providing the groove portion in one of the pair of short side portions or one of the pair of long side portions, a small-size reactor is easily obtained as compared to the case where the groove portions are provided in both of the pair of short side portions or both of the pair of long side portions. Particularly, by providing the groove portion in one of the pair of short side portions, a thinner reactor is easily obtained.

(5) As an example of the reactor of the present disclosure, at least one of the short side portions including no groove portion and the long side portions including no groove portion has an inner surface inclined inwardly of the case from the opening side toward the bottom plate portion side.

If the interval between the assembly and the case is small, the resin for constituting the sealing resin portion is difficult to flow to the short side portion sides including no groove portion or the long side portion sides including no groove portion in forming the sealing resin portion and it is difficult to satisfactorily form the sealing resin portion between the assembly and the case. Accordingly, by forming the inner surface of at least one of the short side portions including no groove portion and the long side portions including no groove portion by an inclined surface, the resin is easily caused to flow to the short side portion side including no groove portion and the long side portion side including no groove portion and the sealing resin portion is easily formed between the assembly and the case. Particularly, if the short side portion includes the groove portion, the resin is caused to flow to the long side portion sides and a region where the resin is difficult to flow becomes larger. Even in this case, the resin is effectively caused to flow to the long side portion side by forming the inner surface of the long side portion by the inclined surface.

(6) As an example of the reactor of the present disclosure, an edge part of the groove portion on the opening side may be chamfered.

By chamfering the edge part of the groove portion on the opening side of the case, a nozzle for injecting the resin into the groove portion is easily inserted in forming the sealing resin portion. Further, the resin dripped on the edge part of the groove portion can be guided into the case in injecting the resin.

DETAILS OF EMBODIMENTS OF PRESENT DISCLOSURE

Specific examples of the reactor according to the embodiments of the present disclosure are described below with reference to the drawings. The same components are denoted by the same reference signs in the drawings. Note that the present invention is not limited to these illustrations and is intended to be represented by claims and include all changes in the scope of claims and in the meaning and scope of equivalents.

First Embodiment

Summary

A reactor 1A of a first embodiment is described with reference to FIGS. 1 to 4. As shown in FIG. 1, the reactor 1A includes a coil 2, a magnetic core 3, a case 5 and a sealing resin portion 6. As shown in FIG. 1, the coil 2 includes a pair of winding portions 21, 22 arranged in parallel. The magnetic core 3 includes inner core portions 31, 32 to be arranged inside the winding portions 21, 22 and outer core portions 33 to be arranged outside the winding portions 21, 22. The case 5 accommodates an assembly 10 including the coil 2 and the magnetic core 3. The sealing resin portion 6 is filled into the case 5. The sealing resin portion 6 is disposed in a clearance between the assembly 10 and the case 5. The reactor 1A of this example further includes holding members 4. The holding members 4 are members for holding the coil 2 and the magnetic core 3 in position. One of features of the reactor 1A of the first embodiment is that the coil 2 is of a vertically stacked type to be described later. Further, one of the features of the reactor 1A of the first embodiment is that a side wall portion 52 constituting the case 5 is provided with groove portions 520. The configuration of the reactor 1A is described in detail below.

<<Coil>>

As shown in FIG. 1, the coil 2 includes the tubular winding portions 21, 22 formed by spirally winding winding wire(s). The coil 2 including a pair of the winding portions 21, 22 come in the following two forms. The coil 2 of the first form includes the winding portions 21, 22 respectively formed by two independent winding wires and a connecting portion formed by connecting one end parts, out of both end parts of the winding wires pulled out from the winding portions 21, 22. The connecting portion may be formed by directing joining the end parts of the winding wires by welding, crimping or the like. Besides, the connecting portion may be formed by indirectly connecting the end parts via an appropriate fitting or the like. The coil 2 of the second form includes the winding portions 21, 22 formed from one continuous winding wire, and a coupling portion constituted by a part of the winding wire extending between the winding portions 21 and 22 and coupling the winding portions 21, 22. In either form described above, the end parts of the winding wire(s) extending from the respective winding portions 21, 22 are pulled out of the case 5 and utilized as parts to which an external device such as a power supply is connected. Note that only the winding portions 21, 22 are shown, but the end parts of the winding wire(s), the connecting portion or the coupling portion are not shown for the convenience of description in FIGS. 1 and 7.

The winding wire may be a coated wire including a conductor wire and an insulation coating covering the outer periphery of the conductor wire. A constituent material of the conductor wire may be copper or the like. A constituent material of the insulation coating may be resin such as polyamide-imide. Specific examples of the coated wire include a coated flat rectangular wire having a rectangular cross-sectional shape and a coated round wire having a circular cross-sectional shape. Specific examples of the winding portions 21, 22 formed from a flat rectangular wire include edge-wise coils.

The winding wire of this example is a coated flat rectangular wire. The winding portions 21, 22 of this example are edge-wise coils. In this example, the specifications such as the shapes, winding directions, the numbers of turns and the like of the winding portions 21, 22 are the same. Note that the shapes, sizes and the like of the winding wire and the winding portions 21, 22 can be changed as appropriate. For example, the winding wire may be a coated round wire. Further, the specifications of the respective winding portions 21, 22 may be different.

The winding portions 21, 22 may have a rectangular end surface shape. That is, the winding portion 21, 22 has four corner parts and a pair of long straight portions and a pair of short straight portions connecting the corner parts. The pair of long straight portions are arranged to face each other, and the pair of short straight portions are arranged to face each other. The end surface shape of the winding portion 21, 22 may be a race track shape with four rounded corners. Since the winding portion 21, 22 includes the straight portions, the outer peripheral surface of the winding portion 21, 22 can be substantially formed by flat surfaces. Thus, the flat surfaces of the winding portions 21, 22 and the flat surfaces of the case 5 can face each other. Since the flat surfaces of the winding portions 21, 22 and the flat surfaces of the case 5 can face each other, intervals between the winding portions 21, 22 and the case 5 are easily narrowed.

The coil 2 of this example is of the vertically stacked type. As shown in FIG. 1, the coil 2 of the vertically stacked type is so arranged that a parallel direction of the pair of winding portions 21, 22 is orthogonal to a bottom plate portion 51 of the case 5. That is, the pair of winding portions 21, 22 are arranged to be stacked in a depth direction of the case 5. One winding portion 21 is arranged on the side of the bottom plate portion 51, and the other winding portion 22 is arranged on the side of an opening 53 of the case 5. The reactor 1A including the coil 2 of the vertically stacked type can reduce an installation area of the winding portions 21, 22 with respect to the bottom plate portion 51 of the case 5 as compared to a reactor including a coil of a horizontally placed type. The coil of the horizontally placed type is so arranged that a parallel direction of a pair of winding portions is parallel to a bottom plate portion of a case as described in Patent Document 1. This is because a length of the assembly 10 along a direction orthogonal to both the parallel direction of the pair of winding portions 21, 22 and axial directions of the both winding portions 21, 22 is generally shorter than a length of the assembly 10 along the parallel direction of the pair of winding portions 21, 22. Thus, the reactor 1A including the coil 2 of the vertically stacked type is long in a direction orthogonal to the bottom plate portion 51, and short in a direction orthogonal to both the direction orthogonal to the bottom plate portion 51 and the axial directions of the winding portions 21, 22. That is, the reactor 1A including the coil 2 of the vertically stacked type is thin. Particularly, if the outer peripheral surfaces of the winding portions 21, 22 are substantially formed by flat surfaces, facing areas of the winding portions 21, 22 and the case 5 can be increased. Moreover, if the outer peripheral surfaces of the winding portions 21, 22 are substantially formed by flat surfaces, the intervals between the winding portions 21, 22 and the case 5 can be easily narrowed. Thus, the reactor 1A including the coil 2 of the vertically stacked type easily dissipates heat generated in the assembly 10 to the case 5 and can improve heat dissipation. The winding portion 21 arranged on the side of the bottom plate portion 51 of the case 5 is facing the bottom plate portion 51 and the side wall portion 52 and dissipates heat also to the bottom plate portion 51 in addition to the side wall portion 52. The winding portion 22 arranged on the side of the opening 53 of the case 5 mainly dissipates heat to the side wall portion 52.

<<Magnetic Core>>

As shown in FIG. 1, the magnetic core 3 includes two inner core portions 31, 32 and two outer core portions 33. The inner core portions 31, 32 are respectively arranged inside the winding portions 21, 22. The outer core portions 33 are arranged outside the winding portions 21, 22. The magnetic core 3 is configured such that the two outer core portions 33 are arranged across the two inner core portions 31, 32 arranged apart from each other. The magnetic core 3 is formed into an annular shape by bringing the end surfaces of the respective inner core portions 31, 32 and the inner end surfaces of the outer core portions 33 into contact. By these two inner core portions 31, 32 and two outer core portions 33, a closed magnetic path is formed when the coil 2 is excited.

[Inner Core Portions]

The inner core portions 31, 32 are parts of the magnetic core 3 extending along the axial directions of the winding portions 21, 22. In this example, both end parts of each inner core portion 31, 32 project from the end surfaces of the winding portion 21, 22. These projecting parts are also parts of the inner core portions 31, 32. The end parts of the inner core portions 31, 32 projecting from the winding portions 21, 22 are inserted into through holes (not shown) of the holding members 4 to be described later.

Each inner core portion 31, 32 of this example is in the form of a rectangular parallelepiped substantially corresponding to the inner peripheral shape of the winding portion 21, 22. Further, the inner core portions 31, 32 of this example respectively have the same shape and the same size. Furthermore, each of the inner core portions 31, 32 of this example is an integrated body having an undivided structure.

[Outer Core Portions]

The outer core portions 33 are parts of the magnetic core 3 to be arranged outside the winding portions 21, 22. The outer core portion 33 has an inner end surface facing and in contact with the end surfaces of the inner core portions 31, 32, an outer end surface opposite to the inner end surface, and a peripheral surface connecting the inner and outer end surfaces. The shape of the outer core portion 33 is not particularly limited as long as the outer core portion 33 is shaped to connect the end parts of the two inner core portions 31, 32. Each of the outer core portions 33 of this example is substantially in the form of a rectangular parallelepiped. Further, the outer core portions 33 of this example respectively have the same shape and the same size. Furthermore, each of the outer core portions 33 of this example is an integrated body having an undivided structure.

[Constituent Materials]

The inner core portions 31, 32 and the outer core portions 33 may be formed by compacts including a soft magnetic material. Examples of the soft magnetic material include metals such as iron and iron alloy and non-metals such as ferrite. The iron alloy is, for example, a Fe—Si alloy, a Fe—Ni alloy or the like. The compact may be a powder compact formed by compression-molding a powder made of a soft magnetic material and further a coated powder including an insulation coating. Further, the compact may be a compact of a composite material obtained by solidifying a fluid mixture containing a soft magnetic material and a resin. The soft magnetic powder is dispersed in the resin in the compact of the composite material. Further, the compact containing the soft magnetic material may be a sintered body such as a ferrite core, a laminate formed by laminating plate materials such as electromagnetic steel plates or the like.

The constituent material of the inner core portions 31, 32 and that of the outer core portions 33 may be the same or may be different. An example in which the constituent materials are different is that the inner core portions 31, 32 are compacts of a composite material and the outer core portions 33 are powder compacts. Another example is that both the inner core portions 31, 32 and the outer core portions 33 are compacts of composite materials, but the type and content of a soft magnetic material are different.

<<Holding Members>

The holding members 4 are members for holding the coil 2 and the magnetic core 3 in position. The holding members 4 are typically made of an electrically insulating material and contribute to an improvement in electrical insulation between the coil 2 and the magnetic core 3. The holding members 4 shown in FIG. 1 include the holding member 4 constituted by a rectangular frame body for holding one end surfaces of the both winding portions 21, 22 and one outer core portion 33, and the holding member 4 constituted by a rectangular frame body for holding the other end surfaces of the both winding portions 21, 22 and the other outer core portion 33.

The holding member 4 includes, for example, a rectangular tube portion for covering the peripheral surface of the outer core portion 33 and an end surface portion arranged on one end surface of the rectangular tube portion to contact the inner end surface of the outer core portion 33. The outer end surface of the outer core portion 33 and a part of the peripheral surface near the outer end surface are exposed from the holding member 4. A part of the inner peripheral surface of the rectangular tube portion is in contact with the peripheral surface of the outer core portion 33, and the outer core portion 33 is held in the rectangular tube portion by this contact part. Other parts of the inner peripheral surface of the rectangular tube portion are not in contact with the peripheral surface of the outer core portion 33, and clearances are formed between these non-contact parts and the peripheral surface of the outer core portion 33. These clearances serve as flow passages for a constituent resin of an unillustrated molded resin portion. The molded resin portion is described in detail in a manufacturing method to be described later. The end surface portion is a B-shaped frame-like member including through holes penetrating from a side where the outer core portion 33 is arranged to a side where the winding portions 21, 22 are arranged. The end parts of the inner core portions 31, 32 are inserted into the through holes. Four corners of the through hole are shaped substantially along the corner parts of the end surface of the inner core portion 31, 32. The inner core portion 31, 32 is held in the through hole by these four corners of the through hole. Edge parts of the through hole connecting the four corners include parts expanded further outward than the contour line of the end surface of the inner core portion 31, 32. With the inner core portions 31, 32 inserted in the through holes, clearances penetrating through the end surface portion are formed in those expanded parts. These clearances serve as flow passages for the constituent resin of the unillustrated molded resin portion. The end surfaces of the inner core portions 31, 32 inserted into the through holes are substantially flush with a surface of the end surface portion on the side where the outer core portion 33 is arranged. Thus, with the inner core portions 31, 32 and the outer core portion 33 held in the holding member 4, the end surfaces of the inner core portions 31, 32 and the inner end surface of the outer core portion 33 are in contact.

The shape, the size and the like of the holding member 4 can be changed as appropriate if the aforementioned function is provided. Further, a known configuration can be utilized for the holding member 4. For example, the holding member 4 may include an inner side portion to be arranged between the winding portions 21, 22 and the inner core portions 31, 32. A peripheral wall portion described in Patent Document 1 may have a shape similar to the inner side portion.

The holding members 4 can be, for example, made of a thermoplastic resin or a thermoplastic resin. The thermoplastic resin is, for example, a polyphenylene sulfide (PPS) resin, a polytetrafluoroethylene (PTFE) resin, a liquid crystal polymer (LCP), a polyamide (PA) resin such as nylon 6 or nylon 66, a polybutylene terephthalate (PBT) resin, an acrylonitrile butadiene styrene (ABS) resin or the like. The thermosetting resin is, for example, an unsaturated polyester resin, an epoxy resin, a urethane resin, a silicone resin or the like. The heat dissipation of the holding members 4 may be improved by containing a ceramic filler in these resins. A non-magnetic powder of alumina, silica or the like can be utilized as the ceramic filler.

<<Case>>

The case 5 has functions of mechanically protecting the assembly 10 and protecting the assembly 10 from an external environment. Protection from an external environment aims to improve corrosion resistance and the like. The case 5 is typically made of a metal material and contributes to an improvement in heat dissipation for releasing heat generated in the assembly 10 to outside. The case 5 is preferably made of metal in terms of heat dissipation, but may be partially or entirely made of resin in terms of weight saving.

The case 5 is a bottomed tubular container including the bottom plate portion 51, the side wall portion 52 and the opening 53. The bottom plate portion 51 is a flat plate member on which the assembly 10 is placed. The side wall portion 52 is a rectangular frame body for surrounding the assembly 10. A space surrounded by the bottom plate portion 51 and the side wall portion 52 serves as an accommodation space for the assembly 10. The opening 53 is formed on a side opposite to the bottom plate portion 51. In this example, the bottom plate portion 51 and the side wall portion 52 are integrally formed.

Figure 4:
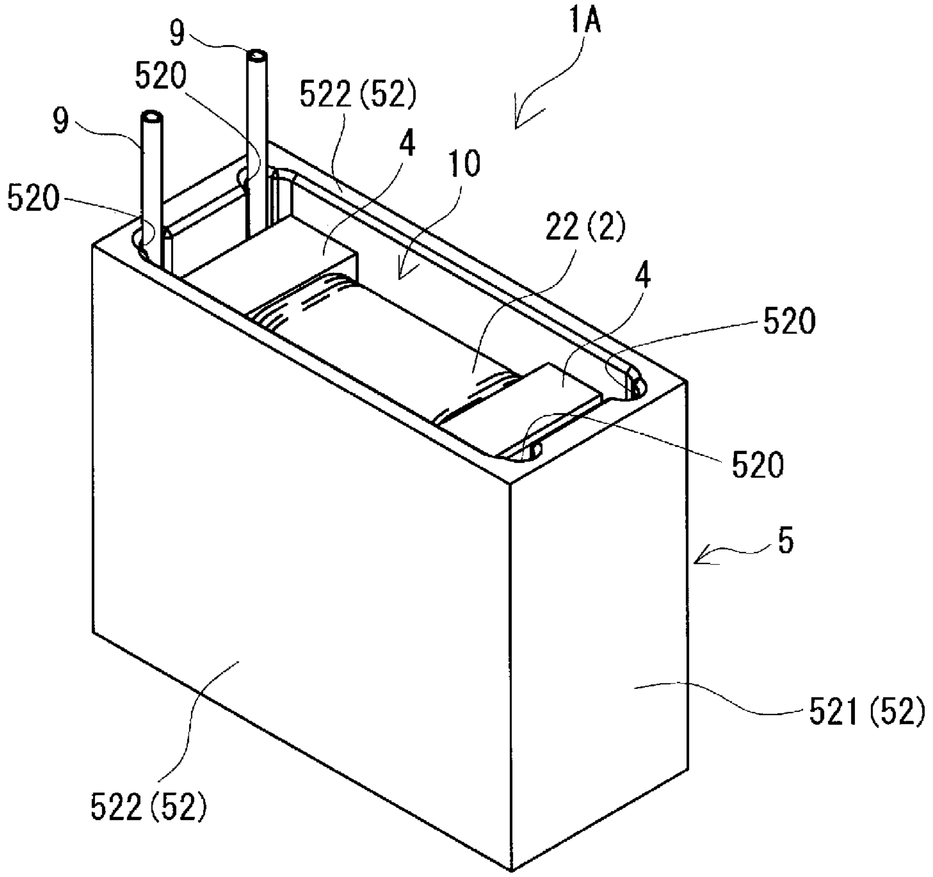
FIG. 4 is a schematic perspective view showing a state where nozzles are arranged in the groove portions provided in the reactor of the first embodiment.

The side wall portion 52 includes a pair of short side portions 521 and a pair of long side portions 522. The short side portions 521 or the long side portions 522 include the groove portions 520 open inward of the case 5. In this example, both of the pair of short side portions 521 include the groove portions 520. The groove portions 520 are continuously provided from the side of the opening 53 toward the side of the bottom plate portion 51 of the case 5. The groove portions 520 serve as flow passages for resin when a resin for constituting the sealing resin portion 6 is injected from the side of the bottom plate portion 51 toward the side of the opening 53 of the case 5 in forming the sealing resin portion 6 to be described later in the case 5. The resin is injected through the groove portions 520 using nozzles 9 as shown in FIG. 4. The injection of the resin is described in detail in the manufacturing method to be described later.

Figure 2A:
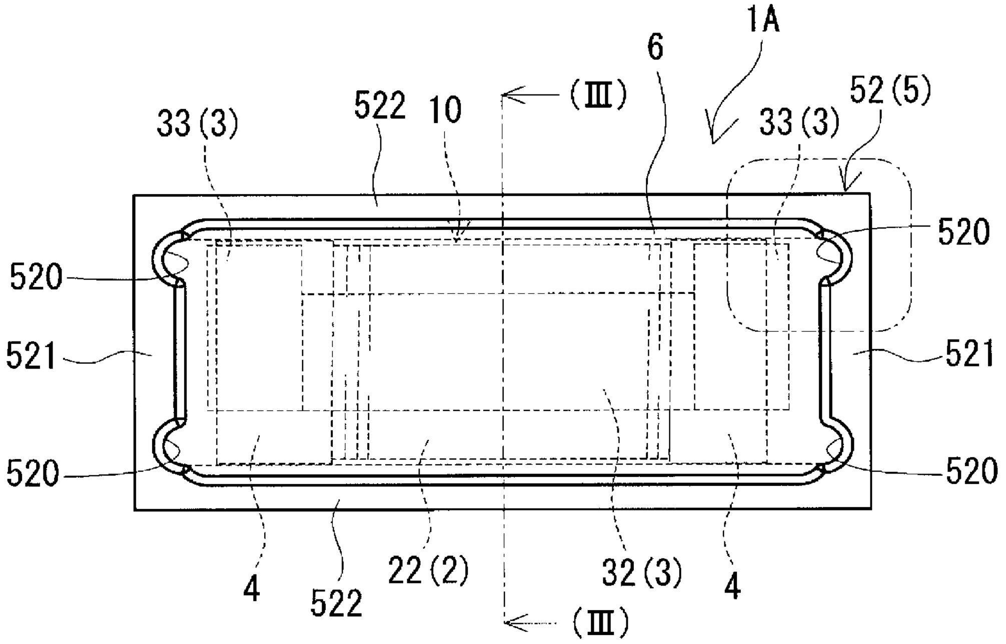
FIG. 2A is a schematic plan view showing the reactor of the first embodiment.

Out of the short side portions 521 and the long side portions 522, the side portions including the groove portions 520 are thicker than the side portions including no groove portions 520 (FIG. 2A). This is to suppress a reduction in the strength of the side wall portion 52 caused by the formation of the groove portions 520. Since the short side portions 521 include the groove portions 520 in this example, the short side portions 521 are thicker than the long side portions 522. In other words, the long side portions 522 are thinner than the short side portions 521.

Figure 2B:
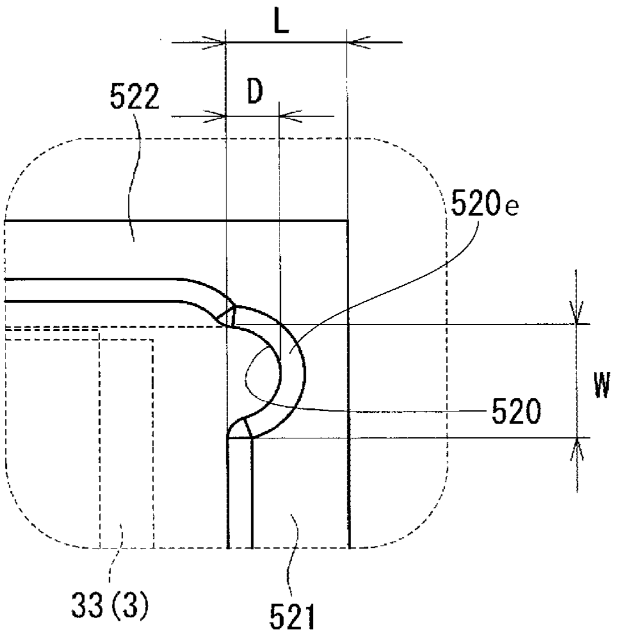
FIG. 2B is a partial enlarged view showing the vicinity of a groove portion provided in the reactor shown in FIG. 2A.

The size of the groove portion 520 can be selected as appropriate. The size of the groove portion 520 here is a horizontal cross-sectional area of the groove portion 520 cut in a direction orthogonal to a longitudinal direction of the groove portion 520. As the groove portions 520 become larger, the nozzles 9 (FIG. 4) are more easily arranged and a large amount of the resin can be injected at once. On the other hand, as the groove portions 520 become smaller, the reactor 1A smaller in size is obtained. An enlarged view of the vicinity of the groove portion 520 enclosed by a two-dot chain line in FIG. 2A is shown in FIG. 2B. The size of the groove portion 520 is, for example, such that a depth D of the groove portion 520 is 40% or more and 50% of less of a thickness L of the side portion including the groove portion 520. The depth D of the groove portion 520 is a largest length from an opening to a groove bottom in the groove portion 520. The side portion including the groove portion 520 of this example is the short side portion 521. By setting the depth D of the groove portion 520 to 40% or more of the thickness L of the side portion including the groove portion 520, the nozzle 9 (FIG. 4) can be easily arranged and a large amount of the resin can be injected at once. On the other hand, by setting the depth D of the groove portion 520 to 50% or less of the thickness L of the side portion including the groove portion 520, the strength of the side wall portion 52 can be ensured and the reactor 1A can have a small size. Further, the depth D of the groove portion 520 may be 42% or more and 47% or less of the thickness L of the side portion including the groove portion 520. Further, the size of the groove portion 520 may be, for example, such that a width W on the opening side of the groove portion 520 is 200% or more and 250% or less of the depth D of the groove portion 520. By setting the width W on the opening side of the groove portion 520 to 200% or more of the depth D of the groove portion 520, the nozzle 9 (FIG. 4) can be easily arranged and a large amount of the resin can be injected. On the other hand, by setting the width W on the opening side of the groove portion 520 to 250% or less of the groove portion 520, the strength of the side wall portion 52 can be ensured. Further, the width W on the opening side of the groove portion 520 may be 210% or more and 240% or less of the depth D of the groove portion 520.

The shape of the groove portion 520 can be selected as appropriate. The shape of the groove portion 520 here is a cross-sectional shape of the groove portion 520 cut in the direction orthogonal to the longitudinal direction of the groove portion 520. The groove portion 520 may be, for example, semicircular, V-shaped or [-shaped. In this example, the groove portion 520 has a semicircular shape.

The formation positions of the groove portions 520 can be selected as appropriate. The groove portions 520 may be provided on both end parts of the short side portion 521 or the long side portion 522. In this example, the groove portions 520 are provided on both end parts of each short side portion 521. The groove portions 520 are provided straight from the side of the opening 53 toward the side of the bottom plate portion 51 of the case 5. If the groove portion 520 is straight, the resistance of the resin flowing in the groove portion 520 can be reduced and the resin is easily injected. Particularly, the groove portion 520 is preferably provided along a direction orthogonal to the bottom plate portion 51. By this arrangement, the groove portion 520 can be made short and the resin is more easily injected. The groove portion 520 may be obliquely provided to intersect the bottom plate portion 51 or may be curved or bent at an intermediate position in the longitudinal direction.

An edge part 520*e* of the groove portion 520 on the side of the opening 53 of the case 5 is preferably chamfered. By chamfering the edge part 520*e*, the nozzle 9 (FIG. 4) is easily inserted into the groove portion 520. Further, in injecting the resin, the resin dripped on the edge part 520*e* of the groove portion 520 can be guided into the case 5. In this example, an edge part of the opening of the groove portion 520 is also chamfered.

Figure 3:
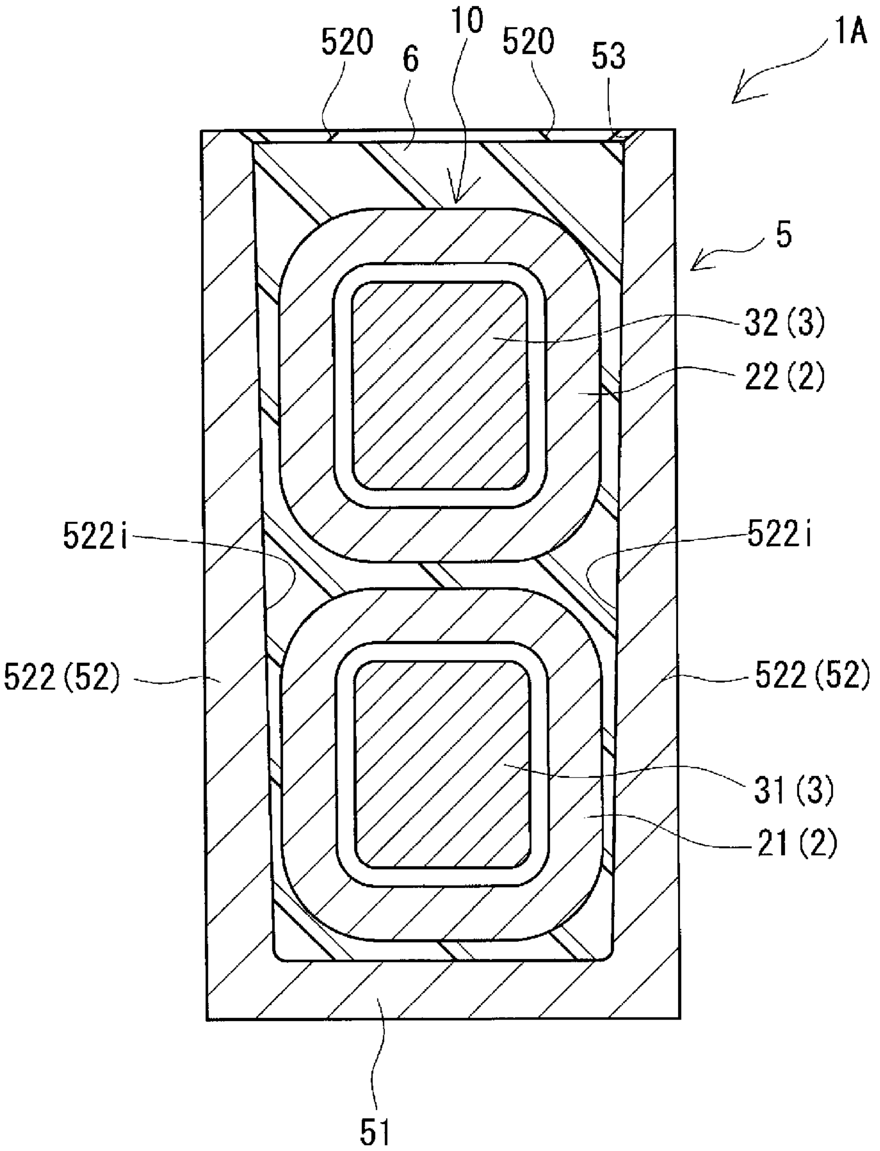
FIG. 3 is a schematic section along (III)-(III) shown in FIG. 2A.

Out of the side wall portion 52, at least one of the short side portions 521 and the long side portions 522 including no groove portions 520 preferably has an inner surface inclined inwardly of the case 5 from the side of the opening 53 toward the side of the bottom plate portion 51 of the case 5. By forming the inner surface of at least one of the short side portions 521 and the long side portions 522 including no groove portions 520 by an inclined surface, the interval between the assembly 10 and the case 5 becomes larger from the side of the bottom plate portion 51 toward the side of the opening 53. By forming a region where the interval between the assembly 10 and the case 10 is large, the resin is easily caused to flow around the assembly 10 and the satisfactory sealing resin portion 6 is easily formed between the assembly 10 and the case 5. The region where the interval between the assembly 10 and the case 5 is large as compared to the case where the inclined surface is not present is formed by the inclined surface, whereby the assembly 10 is easily arranged in the case 5. In this example, as shown in FIG. 3, inner surfaces 522*i* of the both long side portions 522 arranged to face each other are formed by inclined surfaces. If the short side portions 521 include the groove portions 520, the resin is caused to flow toward the long side portions 522 and regions where the resin is difficult to flow become larger. Even in this case, the resin is effectively caused to flow toward the long side portions 522 by forming the inner surfaces 522*i* of the long side portions 522 by the inclined surfaces.

The short side portions 521 or the long side portions 522 including the groove portions 520 preferably have inner surfaces along the direction orthogonal to the bottom plate portion 51. The inner surfaces along the direction orthogonal to the bottom plate portion 51 may be simply referred to as orthogonal surfaces below. By forming the inner surfaces of the short side portions 521 or the long side portions 522 including the groove portions 520 by the orthogonal surfaces, the interval between the assembly 10 and the case 5 can be easily narrowed and can be made substantially uniform in a depth direction of the case 5. Since the interval between the assembly 10 and the case 5 can be made narrow and uniform, the assembly 10 can be positioned to a certain extent in the case 5. In this example, inner surfaces 521*i* of the short side portions 521 are formed by the orthogonal surfaces.

An interval between the assembly 10 and the side wall portion 52 may be 0.5 mm or more and 1 mm or less in a narrowest region. By setting the interval to 0.5 mm or more, the resin is easily filled between the assembly 10 and the side wall portion 52. On the other hand, by setting the interval to 1 mm or less, the small-size reactor 1A is easily obtained. Further, by setting the interval to 1 mm or less, intervals between the winding portions 21, 22 and the side wall portion 52 can be narrowed and the reactor 1A excellent in heat dissipation is easily obtained.

A length of the short side portions 521 may be, for example, 40 mm or more and 80 mm or less. Further, a length of the long side portions 522 may be, for example, 80 mm or more and 120 mm or less. Further, a height of the case 5 may be, for example, 80 mm or more and 150 mm or less. A volume of the reactor 1A may be 250 $cm^3$ or more and 1450 $cm^3$ or less. The length of the short side portions 521 here is an external dimension of the case 5 along a short side direction. Further, the length of the long side portions 522 here is an external dimension of the case 5 along a long side direction. Further, the height of the case 5 here is an external dimension of the case 5 along the depth direction.

The case 5 can be, for example, made of a non-magnetic metal material such as aluminum or aluminum alloy.

<<Sealing Resin Portion>>

The sealing resin portion 6 is filled into the case 5 to at least partially cover the assembly 10. Specifically, the sealing resin portion 6 is disposed in the clearance between the assembly 10 and the case 5. The sealing resin portion 6 is also filled into the groove portions 520. The sealing resin portion 6 has functions of mechanically protecting the assembly 10 and protecting the assembly 10 from an external environment. Protection from an external environment aims to improve corrosion resistance and the like. The sealing resin portion 6 also has a function of improving the strength and rigidity of the reactor 1A by the integration of the assembly 10 and the case 5. The sealing resin portion 6 also has a function of improving electrical insulation between the assembly 10 and the case 5. The sealing resin portion 6 also has a function of improving heat dissipation by transferring the heat of the assembly 10 to the case 5.

The constituent resin of the sealing resin portion 6 is, for example, an epoxy resin, a urethane resin, a silicone resin, an unsaturated polyester resin, a PPS resin or the like. The constituent resin containing a filler excellent in thermal conductivity or a filler excellent in electrical insulation in addition to the above resin component can be utilized for the sealing resin portion 6. The filler is made of a non-metal inorganic material, for example, a non-metal element such as ceramics or carbon nano tubes made of alumina, silica, an oxide such as magnesium oxide, a nitride such as silicon nitride, aluminum nitride or boron nitride or a carbide such as silicon carbide. Besides, known resin compositions can be utilized for the sealing resin portion 6.

<<Manufacturing Method of Reactor>

The aforementioned reactor 1A can be, for example, manufactured via a step of preparing the assembly 10, a step of accommodating the assembly 10 into the case 5 and a step of forming the sealing resin portion 6 in the case 5.

In the step of preparing the assembly 10, the coil 2, the magnetic core 3 and the holding members 4 are assembled to form the assembly 10. At this time, the assembly 10 may be integrated by the unillustrated molded resin portion. Specifically, the outer end surfaces and the peripheral surfaces of the outer core portions 33 are covered by the molded resin portion and the molded resin portion is interposed between the winding portions 21, 22 and the inner core portions 31, 32. With the coil 2 and the magnetic core 3 held in position by the holding members 4, clearances are respectively formed between the rectangular tube portions of the holding members 4 and the outer core portions 33 and between the end surface portions of the holding members 4 and the inner core portions 31, 32. The inner core portions 31, 32 and the outer core portions 33 are integrated by the constituent resin of the resin molded portion injected via these clearances. The winding portions 21, 22 are exposed from the molded resin portion.

The prepared assembly 10 is accommodated into the case 5. At this time, the assembly 10 is so accommodated into the case 5 that the coil 2 is of the vertically stacked type.

The uncured constituent resin of the sealing resin portion 6 is filled into the case 5 having the assembly 10 accommodated therein. The resin is filled in a vacuum tank. The resin is injected via the nozzles 9 inserted between the assembly 10 and the side wall portion 52 along the groove portions 520 as shown in FIG. 4. At this time, the resin is preferably injected into the groove portions 520 formed in one of the pair of short side portions 521 or one of the pair of long side portions 522. This injection form of the resin is called one-end injection. On the other hand, the injection of the resin from both of the pair of short side portions 521 or both of the pair of long side portions 522 arranged to face each other is called both-end injection. With the both-end injection, weak parts called welds are easily formed by the joining of the resin. Thus, the formation of the welds can be suppressed by adopting the one-end injection. Note that the positions of openings of the nozzles 9 can be selected as appropriate. For example, the openings of the nozzles 9 may be arranged near the bottom plate portion 51 or may be arranged at intermediate positions in the height direction of the case 5 or on the side of the opening 53. In any case, the resin flows in spaces formed by the groove portions 520. Thus, the liquid surface of the resin rises from the side of the bottom plate portion 51 toward the side of the opening 53 of the case 5 to cover the outer peripheries of the coil 2 and the magnetic core 3. The assembly 10 is sealed by solidifying the resin in this state.

<<Use Mode>>

The reactor 1A can be utilized as a component of a circuit for performing a voltage stepping-up operation and a voltage stepping-down operation. The reactor 1A can be, for example, used as a constituent component of various converters and power converters. Examples of the converters include in-vehicle converters mounted in vehicles, typically DC-DC converters, and converters of air conditioners. Examples of the vehicle include hybrid vehicles, plug-in hybrid vehicles, electric vehicles and fuel cell vehicles.

<<Effects>>

In the reactor 1A of the first embodiment, the coil 2 is of the vertically stacked type. The reactor 1A including the coil 2 of the vertically stacked type can reduce an installation area with respect to the bottom plate portion 51 of the case 5 as compared to a reactor including a coil of the horizontally placed type. Thus, the reactor 1A of the first embodiment is thin and small in size. Further, the reactor 1A including the coil 2 of the vertically stacked type can increase facing areas of the winding portions 21, 22 and the case 5 as compared to the reactor including the coil of the horizontally placed type. Thus, the reactor 1A of the first embodiment easily releases heat generated in the assembly 10 to the case 5 and can improve heat dissipation.

Further, the reactor 1A of the first embodiment includes the groove portions 520 in the side wall portion 52 of the case 5. Thus, in forming the sealing resin portion 6, the resin for constituting the sealing resin portion 6 can be injected from the side of the bottom plate portion 51 toward the side of the opening 53 of the case 5 and the mixing of air bubbles into the sealing resin portion 6 can be prevented. Thus, the reactor 1A of the first embodiment can satisfactorily fill the sealing resin portion 6 between the assembly 10 and the case 5 and release heat generated in the assembly 10 to the case 5 via the sealing resin portion 6, and is excellent in heat dissipation. Since the sealing resin portion 6 can be satisfactorily filled between the assembly 10 and the case 5 by the groove portions 520, the interval between the assembly 10 and the case 5 can be reduced and the reactor 1A can be miniaturized. Particularly, by providing the groove portions 520 in the short side portions 521 of the side wall portion 52, the reactor 1A can be thinner and smaller in size.

Second Embodiment

Figure 5:
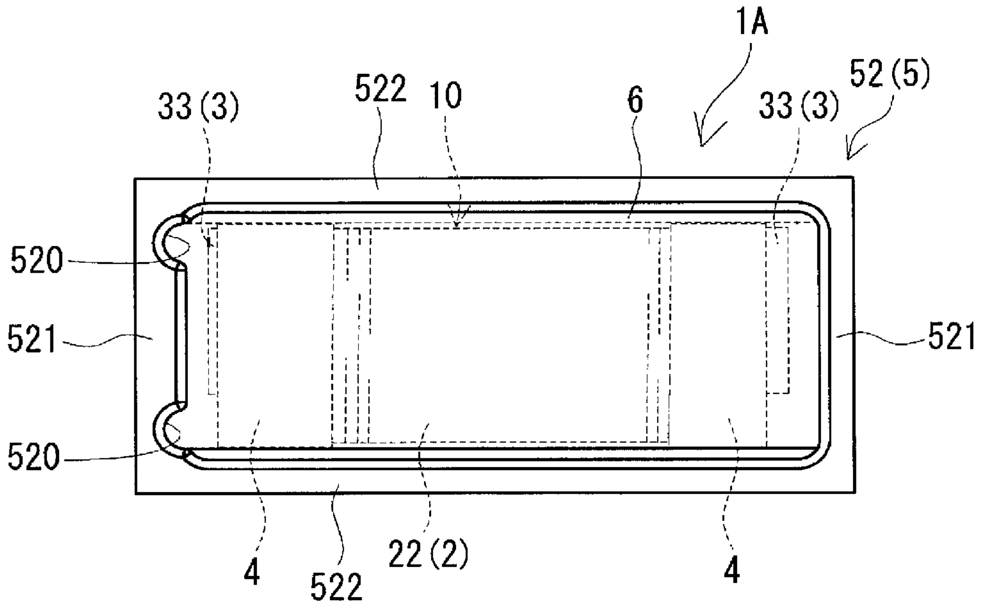
FIG. 5 is a schematic top view showing a reactor of a second embodiment.

Grooves portions 520 may be provided in one of a pair of short side portions 521 or one of a pair of long side portions 522. For example, in the case of providing the groove portions 520 in the short side portion(s) 521, the groove portions 520 may be provided only in one short side portion 521 as shown in FIG. 5. By providing the groove portions 520 in one of the pair of short side portions 521 or one of the pair of long side portions 522, a small-size reactor 1A is easily obtained as compared to the case where the groove portions 520 are formed in both of the pair of short side portions 521 or both of the pair of long side portions 522. This is because the short side portion 521 including no groove portions 520 can be thinned. In forming a sealing resin portion 6, the injection form of a resin for constituting the sealing resin portion 6 is preferably one-end injection. Thus, if one of the pair of short side portions 521 or one of the pair of long side portions 522 is provided with the groove portions 520, the resin is sufficiently injected.

Third Embodiment

Figure 6:
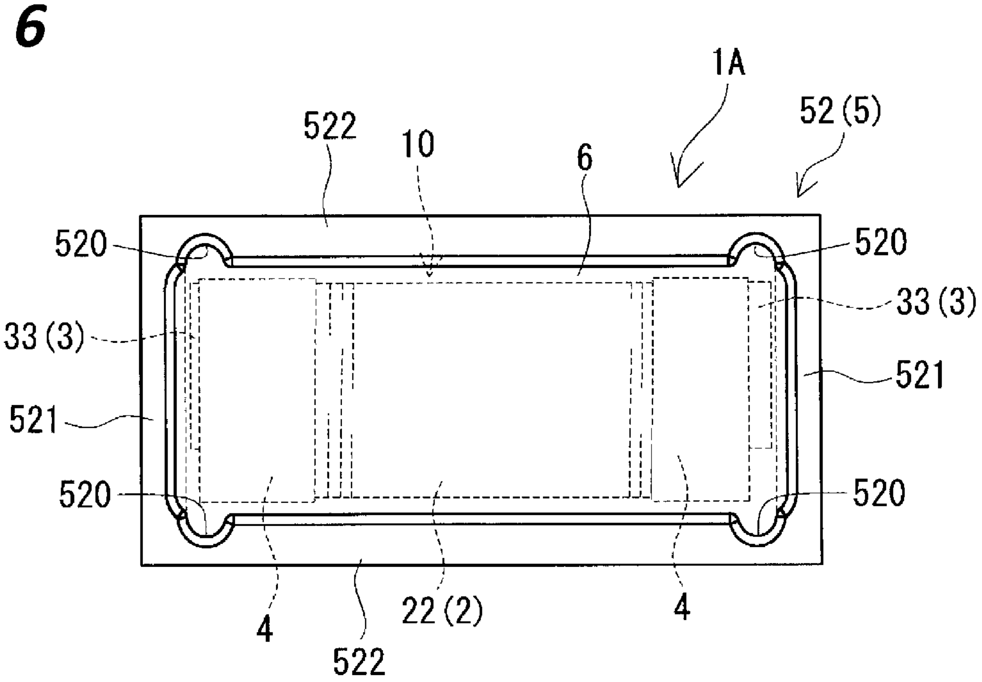
FIG. 6 is a schematic top view showing a reactor of a third embodiment.

As shown in FIG. 6, groove portions 520 may be provided in long side portions 522. If the groove portions 520 are provided in the long side portions 522, the long side portions 522 are thicker than short side portions 521 including no groove portions 520. In other words, the short side portions 521 are thinner than the long side portions 522. Thus, a length of a reactor 1A of a third embodiment along axial directions of winding portions 21, 22 can be made shorter. The groove portions 520 may be provided in both of a pair of the long side portions 522 (FIG. 6) or in one of the pair of long side portions 522. If the groove portions 520 are provided in the long side portion(s) 522, inner surfaces 521*i* (FIG. 1) of the short side portions 521 are preferably formed by inclined surfaces inclined inwardly of a case 5 from the side of an opening 53 toward the side of a bottom plate portion 51 of the case 5. Further, if the groove portions 520 are provided in the long side portion(s) 522, inner surfaces 522*i* (FIG. 1) of the long side portions 522 are preferably formed by orthogonal surfaces along a direction orthogonal to the bottom plate portion 51.

Fourth Embodiment

Figure 7:
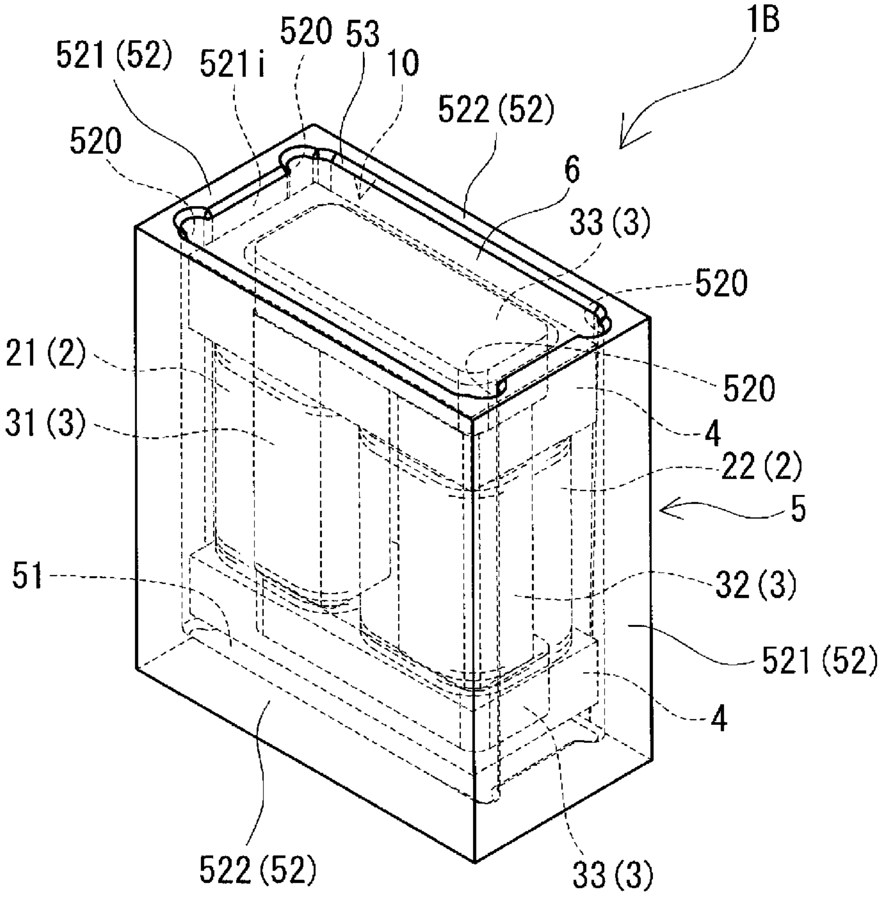
FIG. 7 is a schematic perspective view showing a reactor of a fourth embodiment.

A reactor 1B of a fourth embodiment is described on the basis of FIG. 7. The reactor 1B of the fourth embodiment differs from the first embodiment in that a coil is of an upright type to be described later. The configuration other than the arrangement mode of the coil 2 is the same as in the first embodiment and not described.

In the coil 2 of the upright type, axes of a pair of winding portions 21, 22 are arranged to be orthogonal to a bottom plate portion 51 as shown in FIG. 7. That is, the pair of winding portions 21, 22 are arranged in parallel in a direction from one side to the other side of a side wall portion 52 arranged to facing each other in a case 5. In the case of the coil 2 of the upright type, an assembly 10 is placed with one outer core portion 33 held in contact with the bottom plate portion 51. The reactor 1B including the coil 2 of the upright type can reduce an installation area of the assembly 10 with respect to the bottom plate portion 51 as compared to the reactor including the coil of the horizontally placed type described in Patent Document 1. This is because a length of the assembly 10 along a direction orthogonal to both a parallel direction of the pair of winding portions 21, 22 and axial directions of the winding portions 21, 22 is generally shorter than a length thereof along the axial directions of the winding portions 21, 22. Particularly, if the length of the assembly 10 along the axial directions of the winding portions 21, 22 is longer than a length of the assembly 10 along the parallel direction of the pair of winding portions 21, 22, the reactor 1B including the coil 2 of the upright type can reduce the installation area with respect to the bottom plate portion 51 as compared to the reactor 1A (FIG. 1) including the coil 2 of the vertically stacked type. Further, in this case, the reactor 1B including the coil 2 of the upright type can make an area facing an opening 53 of the case 5 smallest as compared to the reactor 1A including the coil 2 of the vertically stacked type and the reactor including the coil of the horizontally placed type. Thus, an area of the assembly 10 surrounded by the case 5 can be increased, wherefore heat dissipation can be improved. Particularly, if the outer peripheral surfaces of the winding portions 21, 22 are substantially formed by flat surfaces, facing areas of the winding portions 21, 22 and the case 5 can be increased. Moreover, if the outer peripheral surfaces of the winding portions 21, 22 are substantially formed by the flat surfaces, intervals between the winding portions 21, 22 and the case 5 are easily narrowed. Thus, the reactor 1B including the coil 2 of the upright type easily releases heat generated in the assembly 10 to the case 5 and can improve heat dissipation, similarly to the reactor 1A (FIG. 1) including the coil 2 of the vertically stacked type.

The case 5 illustrated in FIG. 7 includes groove portions 520 in both of a pair of short side portions 521. The groove portions 520 may be provided in long side portions 522 or may be provided in one of the pair of short side portions 521 or one of the pair of long side portions 522 as in the second and third embodiments.

DESCRIPTION OF SYMBOLS

1A, 1B reactor
10 assembly
2 coil, 21, 22 winding portion
3 magnetic core
31,32 inner core portion, 33 outer core portion
4 holding member
5 case
51 bottom plate portion
52 side wall portion, 520 groove portion
521 short side portion, 521*i* inner surface,
522 long side portion, 522*i* inner surface
53 opening
6 sealing resin portion
9 nozzle
D depth, L thickness, W width

What is claimed is:

1. A reactor, comprising:
a coil including a pair of winding portions arranged in parallel;
a magnetic core to be arranged inside and outside the winding portions;
a case configured to accommodate an assembly including the coil and the magnetic core; and
a sealing resin portion to be filled into the case,
wherein:
the case includes a bottom plate portion, the assembly being placed on the bottom plate portion, a side wall portion constituted by a rectangular frame body configured to surround the assembly, and an opening provided on a side opposite to the bottom plate portion,
the pair of winding portions are arranged in a parallel direction orthogonal to the bottom plate portion,
the side wall portion includes a pair of short side portions and a pair of long side portions,
the short side portion or the long side portion includes a groove portion continuously provided from the opening side toward the bottom plate portion side and open inward of the case, and
when the assembly is accommodated into the case, a nozzle for injecting resin is inserted between the assembly and the side wall portion along the groove portion.

2. The reactor of claim 1, wherein the groove portion is provided in the short side portion.

3. The reactor of claim 1, wherein the groove portion is provided in one of the pair of short side portions or one of the pair of long side portions.

4. The reactor of claim 1, wherein at least one of the short side portions including no groove portion and the long side portions including no groove portion has an inner surface along a direction orthogonal to the bottom plate portion.

5. The reactor of claim 1, wherein an edge part of the groove portion on the opening side is chamfered.

6. The reactor of claim 1, wherein the groove portion serves as a flow passage for the resin when the resin is injected from the bottom plate portion side toward the opening side of the case.

7. The reactor of claim 1, wherein, out of the short side portion and the long side portion, a side portion including the groove portion are thicker than a side portion including no groove portion.

8. The reactor of claim 1, wherein a depth of the groove portion is 40% or more and 50% or less of a thickness of a side portion including the groove portion.

9. The reactor of claim 1, wherein a width on an opening side of the groove portion is 200% or more and 250% or less of a depth of the groove portion.

10. A reactor, comprising:
a coil including a pair of winding portions arranged in parallel;

a magnetic core to be arranged inside and outside the winding portions;

a case configured to accommodate an assembly including the coil and the magnetic core; and a sealing resin portion to be filled into the case, wherein:

the case includes a bottom plate portion, the assembly being placed on the bottom plate portion, a side wall portion constituted by a rectangular frame body configured to surround the assembly, and an opening provided on a side opposite to the bottom plate portion, the pair of winding portions are so arranged that axes thereof are orthogonal to the bottom plate portion, the side wall portion includes a pair of short side portions and a pair of long side portions, the short side portion or the long side portion includes a groove portion continuously provided from the opening side toward the bottom plate portion side and open inward of the case, and when the assembly is accommodated into the case, a nozzle for injecting resin is inserted between the assembly and the side wall portion along the groove portion.

11. The reactor of claim 2, wherein the groove portion is provided in the short side portion.

12. The reactor of claim 10, wherein the groove portion is provided in one of the pair of short side portions or one of the pair of long side portions.

13. The reactor of claim 10, wherein at least one of the short side portions including no groove portion and the long side portions including no groove portion has an inner surface along a direction orthogonal to the bottom plate portion.

14. The reactor of claim 10, wherein an edge part of the groove portion on the opening side is chamfered.

* * * * *